(12) United States Patent
Hagelin et al.

(10) Patent No.: US 12,000,748 B2
(45) Date of Patent: Jun. 4, 2024

(54) FREQUENCY-MODULATING SENSOR ARRAY

(71) Applicant: SiTime Corporation, Santa Clara, CA (US)

(72) Inventors: Paul M. Hagelin, Saratoga, CA (US); Charles I. Grosjean, Los Gatos, CA (US); Lev Goncharov, St. Petersburg (RU)

(73) Assignee: SiTime Corporation, Santa Clara, CA (US)

( * ) Notice: Subject to any disclaimer, the term of this patent is extended or adjusted under 35 U.S.C. 154(b) by 0 days.

(21) Appl. No.: 18/350,713

(22) Filed: Jul. 11, 2023

(65) Prior Publication Data

US 2024/0011854 A1     Jan. 11, 2024

Related U.S. Application Data

(60) Continuation of application No. 18/080,243, filed on Dec. 13, 2022, now Pat. No. 11,747,229, which is a continuation of application No. 17/712,095, filed on Apr. 2, 2022, now Pat. No. 11,609,136, which is a division of application No. 15/702,717, filed on Sep. 12, 2017, now Pat. No. 11,320,329.

(60) Provisional application No. 62/438,987, filed on Dec. 23, 2016, provisional application No. 62/393,640, filed on Sep. 12, 2016.

(51) Int. Cl.
| | |
|---|---|
| *G01L 5/16* | (2020.01) |
| *G01L 1/14* | (2006.01) |
| *G01L 1/20* | (2006.01) |
| *G01L 9/00* | (2006.01) |

(52) U.S. Cl.
CPC .............. *G01L 5/16* (2013.01); *G01L 1/146* (2013.01); *G01L 1/205* (2013.01); *G01L 9/001* (2013.01)

(58) Field of Classification Search
CPC ......... G01L 1/142; G01L 5/165; G01L 1/148; A61B 90/06; A61B 2090/064; Y10T 29/49117; A61M 25/0067; G01C 19/5719; G01P 15/125
See application file for complete search history.

(56) References Cited

U.S. PATENT DOCUMENTS

| | | |
|---|---|---|
| 11,320,329 B2 | 5/2022 | Hagelin |
| 11,609,136 B2 | 3/2023 | Hagelin |
| 2005/0210980 A1* | 9/2005 | Umemura ............. G01P 15/125 73/514.32 |
| 2011/0100126 A1 | 5/2011 | Jeong |

(Continued)

FOREIGN PATENT DOCUMENTS

| | | |
|---|---|---|
| WO | 2011022665 A1 | 2/2011 |
| WO | 2011046986 A2 | 4/2011 |

OTHER PUBLICATIONS

International Preliminary Report on Patentability dated Mar. 21, 2019 in International Application No. PCT/US2017/051234, 11 pages.

(Continued)

*Primary Examiner* — Brandi N Hopkins

(57) ABSTRACT

Spatially-distributed resonant MEMS sensors are coordinated to generate frequency-modulated signals indicative of regional contact forces, ambient conditions and/or environmental composition.

22 Claims, 10 Drawing Sheets

(56) References Cited

U.S. PATENT DOCUMENTS

| | | | |
|---|---|---|---|
| 2015/0053023 A1* | 2/2015 | Gossner | G01C 19/5719 |
| | | | 73/862.68 |
| 2017/0093361 A1* | 3/2017 | Grosjean | H03H 9/2463 |
| 2018/0087984 A1* | 3/2018 | Hagelin | G01L 1/146 |
| 2018/0372563 A1 | 12/2018 | Rogers | |

OTHER PUBLICATIONS

International Search Report and Written Opinion of International Searching Authority dated Dec. 20, 2017 in International Application No. PCT/US2017/051234, 14 pages.

\* cited by examiner

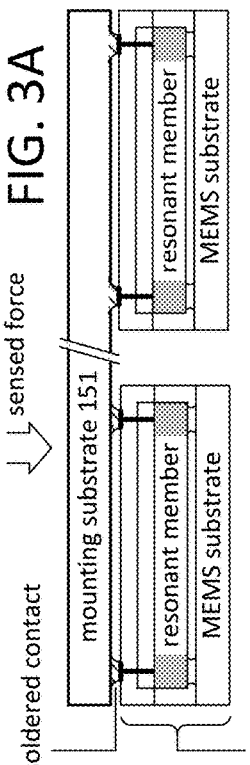
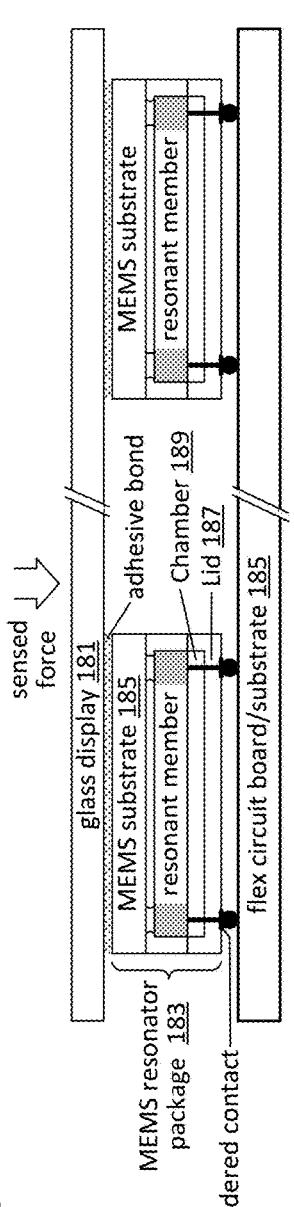
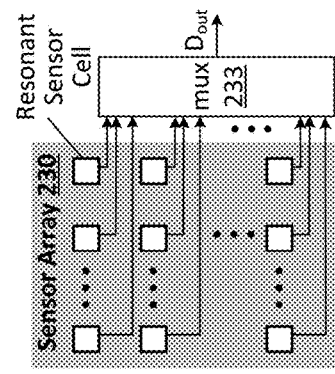
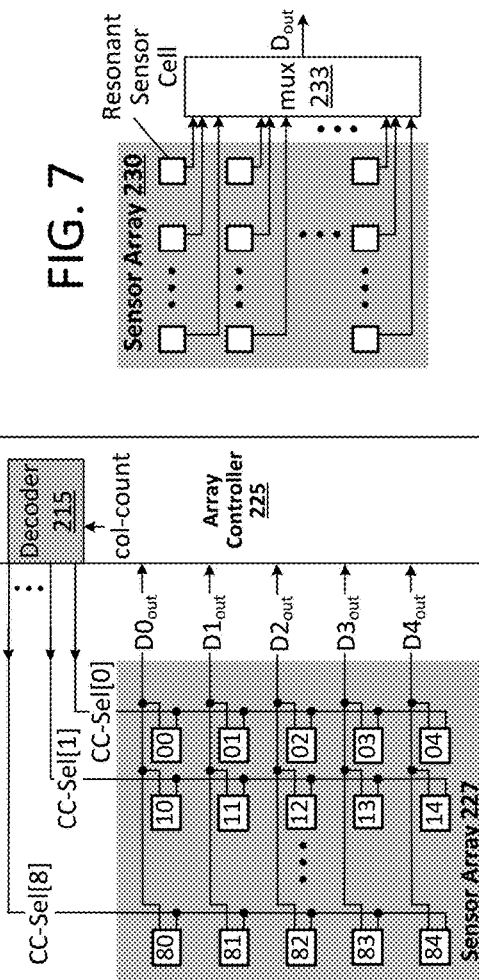
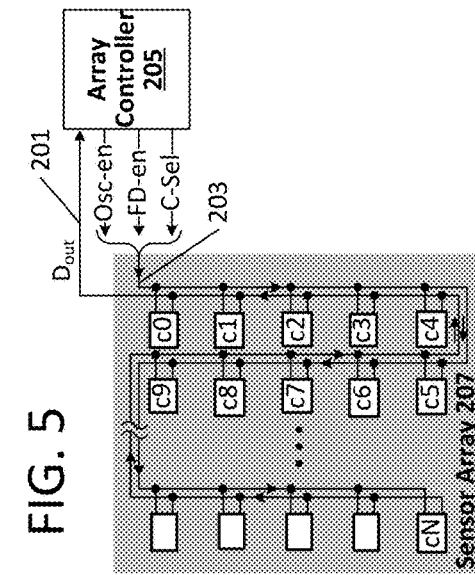

Pipelined sense & readout

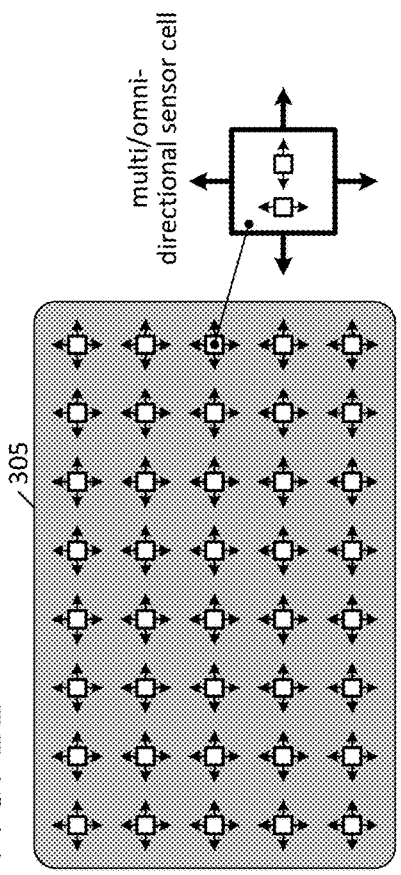
FIG. 11 Multi-Axis Sensitivity
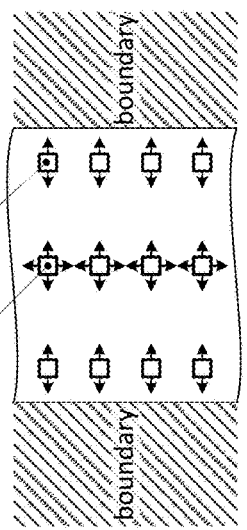
FIG. 12 Multi-Axis Sensitivity
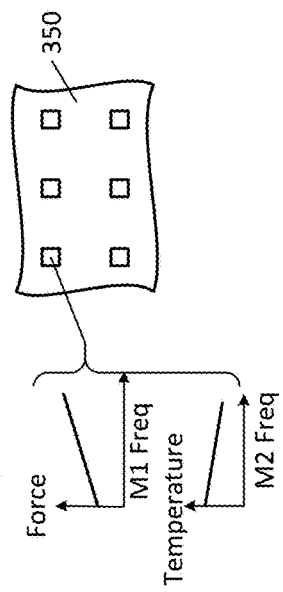
FIG. 13C omni cell 337 high sensitivity cell 335
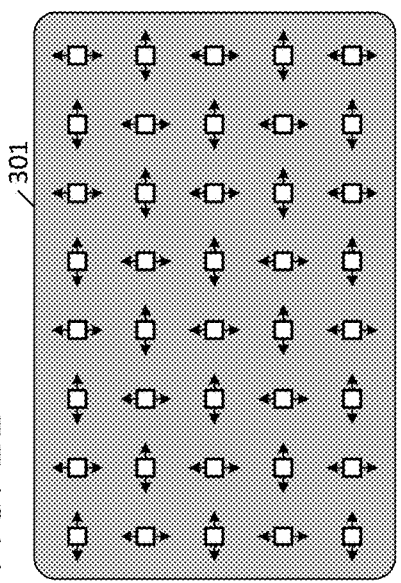
FIG. 13A Regionally Anisotropic Sensor Array
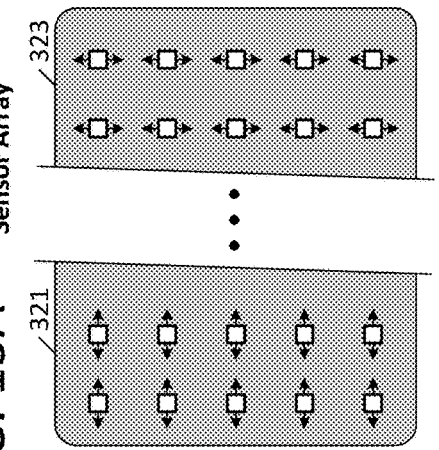
FIG. 13B high discrimination zone ('X' = interface target)
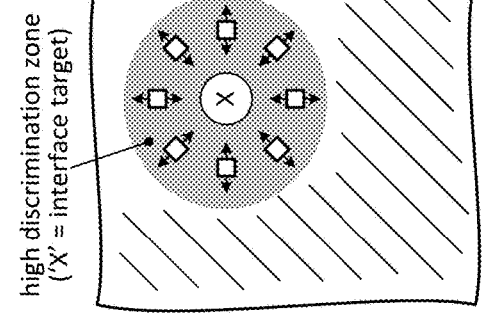
FIG. 14 multi-sensing cells

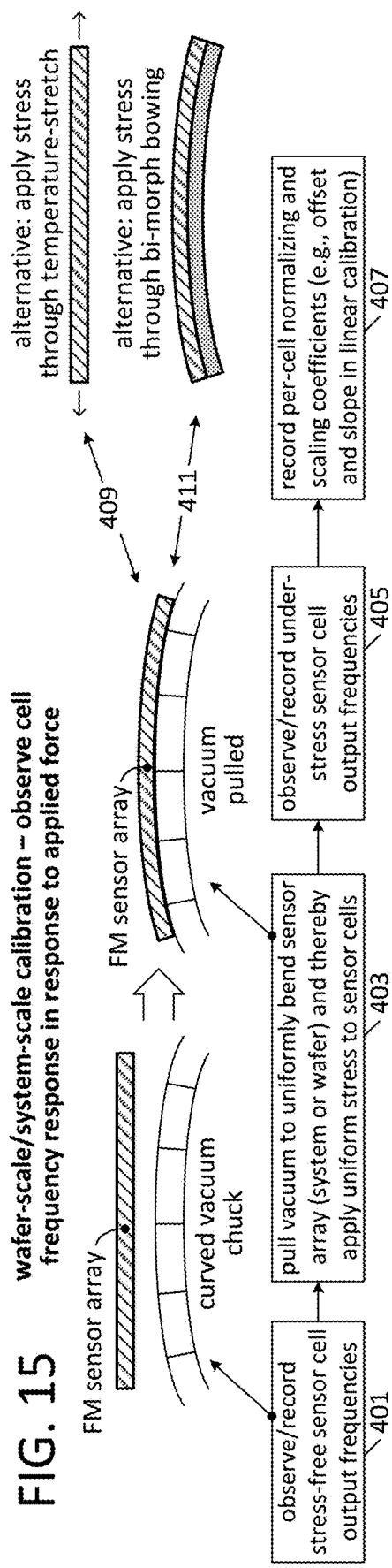
FIG. 15 wafer-scale/system-scale calibration – observe cell frequency response in response to applied force
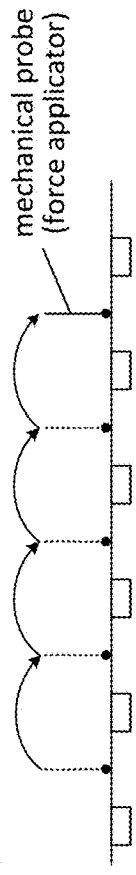
FIG. 16A system level calibration
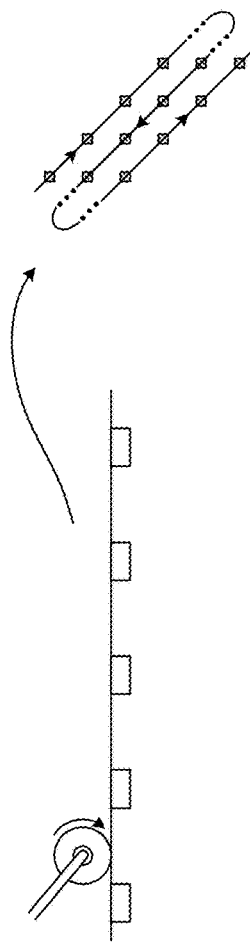
FIG. 16B system level calibration

FREQUENCY-MODULATING SENSOR ARRAY

INCORPORATION BY REFERENCE

This application is a continuation application of U.S. Utility patent application Ser. No. 18/080,243, which was filed Dec. 13, 2022, for "Frequency-modulating sensor array," which in turn is a continuation application of U.S. Utility patent application Ser. No. 17/712,095, which was filed Apr. 2, 2022, for "Frequency-modulating sensor array" (now U.S. patent Ser. No. 11/609,136), which in turn is a divisional application of U.S. Utility patent application Ser. No. 15/702,717, which was filed on Sep. 12, 2022, for "Frequency-modulating sensor array" (now U.S. patent Ser. No. 11/320,329), which in turn claims priority to U.S. Provisional Patent Application No. 62/393,640, which was filed Sep. 12, 2016, for "MEMS networks for sensing," and to U.S. Provisional Patent Application No. 62/438,987, which was filed Dec. 23, 2016, for "Frequency-modulating sensor array." Each of the aforementioned patent applications is hereby incorporated by reference."

TECHNICAL FIELD

The present disclosure relates to microelectromechanical system (MEMS) sensors.

DRAWINGS

The various embodiments disclosed herein are illustrated by way of example, and not by way of limitation, in the figures of the accompanying drawings and in which like reference numerals refer to similar elements and in which:

FIGS. 3A and 3B illustrate sensor-array embodiments in which MEMS resonators are flipped relative to the orientation shown in FIG. 2;

FIG. 4 illustrates another alternative sensor array configuration in which MEMS resonators are disposed between a mounting substrate and a flexible interconnect substrate;

FIG. 5 illustrates a resonant sensor architecture having fully sequential data readout and
unified sensor control bus;

FIG. 6 illustrates an alternative resonant sensor system architecture in which cells are read out one column at a time, with all cells in a given column delivering data to the array controller in parallel via respective row data lines;

FIG. 7 illustrates an alternative resonant sensor array architecture in which the sensor-cell-output multiplexing function is consolidated at an edge or output point of the resonant sensor array;

FIG. 11 illustrates disposition of directionally-sensitive sensor cells in alternating orientations (indicated by arrows extending from individual sensor cells) to achieve multi-axis sensitivity and thus an isotropic sensor array;

FIG. 12 illustrates an alternative approach in which co-located sensors yield multi-axis sensitivity and thus isotropic character at each sensor-cell site;

FIGS. 13A-13C illustrate embodiments of resonant sensor arrays in which sensor cells having different axes of sensitivity are disposed in different regions of the sensor array;

FIG. 14 illustrates a resonant sensor array embodiment populated in whole or part by sensor cells that exhibit frequency change in response to applied force and temperature and thus multi-property sensitivity;

FIG. 15 illustrates a number of wafer-level and system-level calibration techniques in which a wafer or singulated sensor array is subject to uniform stress for purposes of canceling systemic offsets and scaling differences between respective sensor cell outputs;

FIGS. 16A and 16B illustrates additional or alternative system-level calibrations in which one or more distributed or point forces are applied at respective resonant-sensor-array surface regions or points to enable generation of output compensation coefficients;

DETAILED DESCRIPTION

In various embodiments disclosed herein, spatially-distributed resonant MEMS sensors are coordinated to generate frequency-modulated signals indicative of regional forces, ambient conditions and/or environmental composition. In general, individual sensors within the array generate signals that oscillate at a frequency that tracks the sensed property—increasing or decreasing in frequency in response to an increase or decrease in applied force, for example, and thus a frequency modulated output that enables significantly better noise rejection than conventional analog sensors as well as substantially reduced digitization power and circuit overhead. A number of embodiments discussed in greater detail below relate to force-touch sensing as may be employed in a touch screen or other user interface. More generally, a broad range of ambient and differential inputs may be sensed (e.g., temperature, vapor, gas, bulk forces, vibration, etc.) and sensor cells may be fabricated, architected and operated in numerous different ways to achieve high-resolution, low power and low cost sensor networks. Moreover, the various arrangements of resonant MEMS sensors (generally referred to herein as "sensor arrays," though "array" is used broadly herein to mean any spatial distribution of coordinated sensors) may be included in a wide variety of host devices, including various mobile or handheld electronic devices such as smartphones, wrist-worn devices (wristwatches, wrist or ankle bracelets, etc.) and any other standalone or network-connected electronic device in which the sensor array output may be useful. In a number of embodiments, the spatially-distributed MEMS sensors are affixed/mounted to (or within) or otherwise physically disposed with respect to a common "sensor fabric" such as a substrate, material layer, planar or contoured surface, housing or other volume, etc. In other embodiments, spatially distributed MEMS sensors may be more generally disposed within a space or region with or without a common sensor fabric. Spatial dispositions (relative or absolute locations) of individual sensors may be mapped dynamically (learned) or predetermined/pre-recorded, with such location information being made available to sensor control circuitry (e.g., for purposes of triangulating the locus or region of sensed event).

Figure 1:
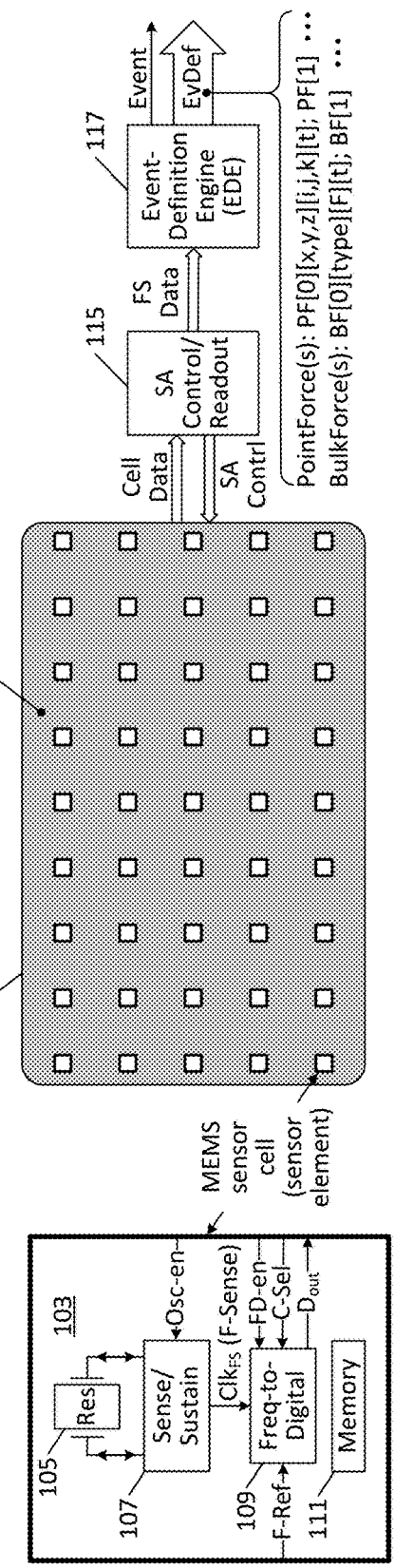
FIG. 1 illustrates an exemplary frequency-modulating sensor array in the form of a touch screen having a sensor mounting substrate to which a network of component MEMS sensors are secured.

FIG. 1 illustrates an exemplary frequency-modulating sensor array 100 in the form of a touch screen having a sensor mounting substrate 101 (or carrier or fabric) to which a network of component MEMS sensors are secured, affixed or otherwise disposed in physical contact. In the particular embodiment shown, each individual sensor element—referred to herein as a sensor cell or resonant-sensor cell and depicted in detail view 103—includes a respective MEMS resonator 105 together with a sense/sustain circuit 107 and frequency-to-digital converter (FDC) 109. Each sensor cell (or any subset of the sensor cells) may also include local memory 111 (e.g., one-time or multi-time programmable non-volatile memory (NVM), random access memory (RAM), etc.) to store information about calibration, sensor location, signal history (e.g., maximum and/or minimum over a given interval), sensor-state information (active/inactive, reduced-power mode, etc.), information received from other sensor cells, and/or other information to be received or conveyed with respect to other components of the sensor array or host system. As discussed below, resonant-sensor cells 103 having lower levels of component integration may be implemented in alternative embodiments, omitting the local memory and/or frequency-to-digital converter, for example, or even omitting the sense/sustain circuit. In those cases, a global resource or cell-group resource may be provided to carry out resonator sense/sustain operations (i.e., sensing and/or triggering resonant oscillation of the MEMS resonator) and/or frequency-to-digital conversion with respect to the pulse train generated by the MEMS resonator.

Still referring to FIG. 1, the MEMS resonator 105 depicted within each sensor cell 103—there may be more than one—oscillates at a resonant frequency (e.g., in response to periodic electrostatic force, piezoelectric actuation or other mechanical perturbation imparted by sense/sustain circuit 107) dependent upon one or more properties the sensor is intended to detect and thus at least according to applied force in the depicted touch-screen/touch-force application. Sense/sustain circuit 107 senses the resonator oscillation/vibration and generates a "force-sense" clock signal, $Clk_{FS}$, at the resonant frequency or a multiple thereof. Frequency-to-digital converter 109 receives the force-sense clock signal and generates in turn a corresponding multi-bit digital output, $D_{OUT}$—a "frequency word" that is a function of the resonator oscillation frequency (i.e., numeric value in proportion to or having another mathematical relation to the MEMS resonator frequency).

Figure 2:
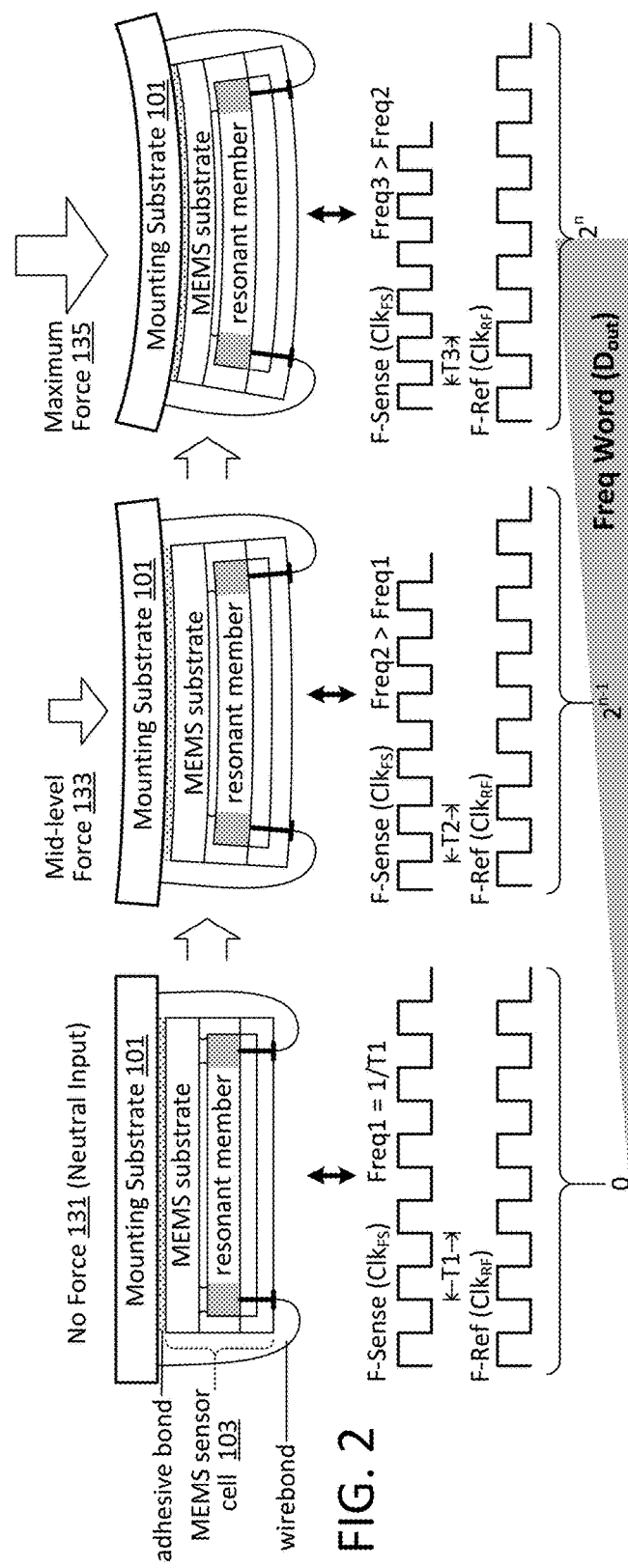
FIG. 2 illustrates an example of sensor cell operation in response to respective levels of contact force that produce corresponding deflections of the mounting substrate, progressing from a neutral force to a mid-point force to a maximum force.

FIG. 2 illustrates an example of sensor cell operation in response to respective levels of contact force that produce corresponding deflections of mounting substrate 101, progressing from a neutral force 131 (no contact) to a mid-level force 133 to a maximum (saturating) force 135. As shown, the mounting substrate deflection exerts a tensile force in the MEMS resonant member ("resonant member" anchored to a "MEMS substrate" in the depicted example) and thus, like tightening a guitar string, raises its resonant frequency, shrinking the mechanical-oscillation cycle time (clock period) from T1 to T2 to T3 as the contact force progresses from zero to mid-point to maximum. In the particular embodiment shown, an n-bit frequency word generated within a local (inside the sensor cell) or remote (outside the sensor cell) frequency-to-digital converter is linearly proportional to the contact force and thus ramps from 0 (no force) to $2^{n-1}$ at the midpoint force and saturates at $2^n$ (or, more accurately, $2^n-1$) at the maximum force.

Still referring to FIG. 2, it should be noted that flexure of the mounting substrate and MEMS resonator are exaggerated to illustrate the tensioning principle of operation. Also, while MEMS sensor cell 103 (which may include one or more additional dies) is depicted as adhesively bonded to a mounting substrate that also provides for signal interconnect (hence the wirebonds shown between resonator contacts and the mounting substrate which may be, for example, a printed circuit board), various other mounting and/or signal interconnect arrangements may be employed in alternative embodiments. FIGS. 3A and 3B, for example, illustrate arrangements in which MEMS resonators (each containing a resonant MEMS structure "resonant member") are flipped relative to the orientation shown in FIG. 2, with MEMS package 153 having contacts soldered to counterpart electrical contacts on mounting substrate 151 in FIG. 3A (e.g., a printed circuit board or other electrical interconnect substrate) and with the mounting substrate forming the substrate to which individual resonant members are anchored in FIG. 3B (i.e., substrate 161 serves dual duty as both mounting substrate and the substrate to which the MEMS resonant structure is anchored).

FIG. 4 illustrates another alternative embodiment in which MEMS resonators 183 are disposed between a mounting substrate—a glass display 181 in this example—and a flexible interconnect substrate 185. In the depicted implementation, contacts on the outer surface of the lid (187) of each MEMS resonator 183 (i.e., a lid that encapsulates a cavity/chamber 189 containing a resonant member) are soldered to counterpart contacts on an interconnect substrate 185 (e.g., a flexible circuit board), while the package substrate 185 of each MEMS resonator 183 is adhered directly or indirectly to the glass display—an arrangement that may be flipped in alternative embodiments. More generally, any disposition and interconnection of spatially distributed MEMS resonators with respect to a mounting substrate and/or interconnect substrate (which may be one and the same) that yields a modulated resonator frequency in response to applied force may be employed in alternative embodiments, including embodiments that exert compressive force on the resonant member instead of or in addition to tensile force.

Returning to FIG. 1, the frequency-modulating sensor array 100 is coupled to a sensor-array control/readout circuit 115 which issues control signals to the array and receives cell data (i.e., respective frequency words) therefrom, and in turn, delivers force-sense data downstream to an event definition engine 117. Collectively the sensor-array control/readout circuit 115 (referred to herein as the "array controller" or just "controller" for brevity) and sensor array 100 constitute a frequency-modulating sensor system. Event definition engine 117, which evaluates the raw force-sense data to resolve and report input events (e.g., user contact(s) and/or bulk forces such as shear or twisting forces or vibration within a smartphone or other host device), may alternately be viewed as an integral component of the sensor system or as an external sensor data destination.

In one embodiment, the control signals issued by array controller 115 include cell-enable signals to effect tiered (progressive) power-down states within individual sensor cells 103, as well as cell-selection signals to enable time-multiplexed readout of individual sensor cells. Referring to exemplary detail view of sensor cell 101, the cell-enable signals may include, for example and without limitation, an oscillator-enable signal ("Osc-en") and a frequency-to-digital-enable signal ("FD-en") which enable/disable operation of sense/sustain circuit 107 and FDC converter 109, respectively. Accordingly, the array controller may deassert the FD-enable signal to transition the sensor array to a first reduced power-consumption level (e.g., from which the sensor array or any portion thereof may be relatively quickly be restored to active status), and may additionally deassert the oscillator-enable signal to also disable operation of the sense/sustain circuit and thereby render the MEMS resonator to an idle (non-oscillating) state—a second reduced power-consumption level that requires a longer wake (restore to active) time. The array controller may also output various signals to control storage and retrieval of data within/from the local memory 111 of individual sensor cells or cell groups (e.g., calibration data, sensor location data, signal history data, sensor-state data, data from other sensor cells, etc.). In one embodiment, for example, one or more additional control signals may be provided to effectuate such memory read and write operations with those signals being dedicated to memory access and/or acting to qualify the other control/select signals (e.g., the collective set of control signals or any group thereof conveying an encoded command). Stored/retrieved data may be conveyed between sensor cells and the array controller via cell data lines (e.g., with the data output lines, $D_{OUT}$, being driven bidirectionally and thus serving as cell data inputs and outputs) and/or one or more control lines.

Still referring to FIG. 1, cell-selection signals are conveyed from the array controller to individual sensor cells through one or more cell-selection lines ("C-Sel" as shown within the detail view of sensor cell 103) according to readout parallelism within the sensor array. In a number of embodiments, for example, sensor cells are read-out one row at a time, with all cells within a selected row delivering data in parallel (and simultaneously) to the array controller via a respective column read-out bus. In other embodiments, time-multiplexed readout is extended to all sensor cells in the array so that every cell in the array is readout during a respective timeslot (within an array readout fame) and via a single shared readout bus. Cell-enable signals may similarly be conveyed via respective control signal buses that are coupled in common to all cells in the array or subsets thereof (e.g., sub-groupings to enable low-power modes in which some but not all cells are disabled).

FIG. 5 illustrates a resonant sensor system architecture having fully sequential data readout and unified sensor control bus (i.e., each data readout line within readout bus 201 and each control signal line within control bus 203 is coupled in common to all sensor cells). Accordingly, array controller 205 renders the entirety of sensor cell array 207 to an active sensing mode (i.e., fully enabled) by asserting an oscillator-enable signal ("Osc-en") and FD-enable signal ("FD-en") on a solitary pair of enable lines (i.e., respective control signal lines each of which is coupled to all sensor cells in the sensor array), and array controller issues a sequence of cell-identifier values on a shared cell-select bus (part of control bus 203) to enable individual sensor cells c0, c1, c2, . . . , cN to drive the shared readout bus one after another. In one embodiment, for example, unique cell identifier values are pre-programmed within local memory of each cell (e.g., at startup via a serial input/output path (not shown)) or hard-coded within each cell (e.g., by wired strapping of cell ID nodes to establish a unique cell ID) and thereafter compared with the sequence of cell identifiers transmitted by array controller 205 to establish round-robin readout of individual cells.

FIG. 6 illustrates an alternative resonant sensor system architecture in which sensor cells are read out one column at a time, with all cells in a given column delivering data to array controller 225 in parallel (concurrently/simultaneously) via respective row data lines. Note that the row/column designation is arbitrary—sensor cells may be selected one row at a time and deliver data to array controller 225 via respective column readout lines. In the embodiment shown, array controller 225 sequences through a modulo column count (e.g., 0 to 8 in a sensor array having nine columns of sensor cells as shown in FIG. 1—more or fewer sensor cell columns may be implemented in alternative embodiments) which is decoded within decoder 215 to assert cell-column selection signals 0-8 (i.e., CC-Sel[0], CC-Sel[1], . . . , CC-Sel[8]) one after another and thereby enable corresponding columns of sensor cells to output respective sets of frequency words in succession (five frequency words in a sensor array having five rows of sensor cells as shown in FIG. 1—more or fewer cell rows may be provided) to array controller 225 via readout lines $D0_{OUT}$-$D4_{OUT}$. A single shared set of enable signals (not shown) may be coupled in common to all cells in the sensor array, or multiple sets of enable signals may be provided to respective subsets of sensor cells. For example, two sets of enable signals may be coupled to respective halves of the sensor cells (e.g., one enable-signal set coupled to every other row and every other column of sensor cells, and the other enable-signal set coupled to the remaining sensor cells) to enable reduced sensitivity and reduced power consumption when the host device transitions to a reduced-power-consumption mode.

Returning briefly to FIG. 5, it will be appreciated that the cell-select circuits within the various sensor cells (e.g., one or more transistor switches that interconnect an internal output-signal node of the sensor cell with the shared data output line) collectively form a multiplexer that is distributed among the sensor cells. FIG. 7 illustrates an alternative resonant sensor array architecture in which the sensor-cell-output multiplexing function is consolidated at an edge or output point of sensor array 230 (and thus may be viewed as distinct from the sensor array), with output lines from individual sensor cells extending to respective input ports of a multiplexer 233 which is sequenced by an array controller to enable the output of each sensor cell to pass through multiplexer 233 to the data output line (Dour) in respective readout time intervals. In yet other read-out embodiments, sensor-cell data may be transferred between individual sensor cells prior to being read out (e.g., transferred from one cell to another in a data-shifted read-out approach). In those cases data transfer between individual sensor cells may be conducted via wired cell-to-cell signaling paths or may be implemented wirelessly. More generally, any communication between two or more sensor cells and/or between an array controller and individual sensor cells or groups of sensor cells may be implemented wirelessly according to standard or proprietary wireless signaling protocols and hardware specifications (e.g., Bluetooth, Wi-Fi, WiMax, Cellular, Near Field Communication, etc.).

Figure 8:
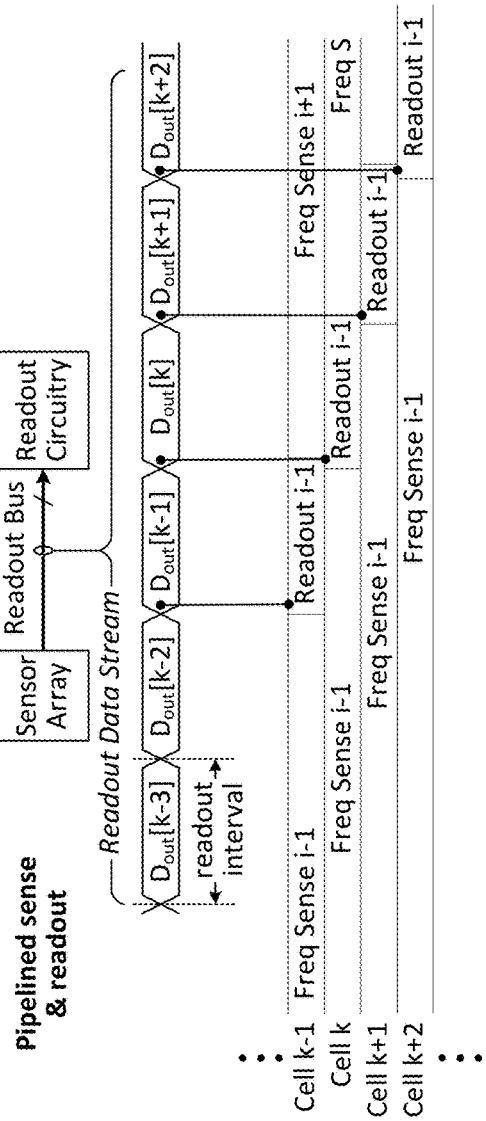
FIG. 8 illustrates an exemplary cell readout sequence within the resonant sensor system of FIG. 5 or 7, demonstrating pipelined sense and readout operations.

FIG. 8 illustrates an exemplary cell readout sequence within the resonant sensor system of FIG. 5 or 7, demonstrating pipelined sense and readout operations (i.e., frequency word generation within cell k temporally overlaps readout interval/cell-data transmission interval of preceding cell k−1; frequency word generation within cell k+1 temporally overlaps readout interval of cell k and so forth). A similar pipelined readout may be implemented with respect to subgroups of sensor cells. For example, the column readout architecture shown in FIG. 6 may be readout generally as shown in FIG. 8, but with the pipelined sense and readout sequence being implemented with respect to columns (or rows) of cells instead of individual cells (i.e., "cell k−1" becomes "cell column k−1" or "cell row k−1"). Also, while FIG. 8 depicts each cell as being in either a read-out state or frequency-sense state (i.e., generating a frequency word) at any given time, in implementations in which frequency word generation within a sensor cell requires less time than the interval between successive readouts of that cell, the sensor cell may be idled (e.g., through assertion of an FD-enable directed at that cell by virtue of identifier or wire-decoding) and/or engaged in other actions, including calibration actions, generation/read-out of signals relating to alternative sensing operations (e.g., temperature sensing), etc.

Returning again to FIG. 1 and assuming that array controller 115 receives, in each of a sequence of readout frames, a frequency word for each sensor cell 103 in sensor array 100, the array controller may then output to event definition engine 117 a temporal sequence of applied force images analogous to luminance images captured within an image sensor (i.e., each applied-force image including a frequency word read from each sensor cell in sensor array 100). In one embodiment, the event definition engine evaluates the incoming applied-force images or data derived therefrom (i.e., force-sense data, "FS-Data"), interpreting predetermined or learned patterns of localized force applications as point forces (e.g., user contact with respect to a touchscreen, button or other user-input device) and interpreting predetermined or learned patterns of distributed force patterns as bulk forces, such as shear forces, compression (squeeze) forces, tensile (stretching) forces, twisting (torque) forces, vibrational forces and so forth. Event definition engine 117 may also temporally correlate point forces and/or bulk forces indicated by successive applied-force images to report a broad variety of user actions, gestures and/or contact-object motions (finger swipes, stylus-swipes, fingering sequences, double-taps, double-squeezes or presses, etc.). In one embodiment, event definition engine 117 generates, for each force-sense data readout frame, a listing of all point-force detections, PF[0], PF[1], . . . , PF[n] and bulk-force detections BF[0], BF[1], . . . BF[m], together with an optional event signal to indicate whether any such point or bulk forces have been detected. In the depicted implementation, each reported point-force is characterized by two-dimensional or three-dimensional point-of-contact coordinates [x, y, z] (i.e., three dimensional where, for example, sensors are dispersed in a 3-D space such as at various locations on the surface of a smartphone or other handheld device), force vector [i, j, k] (i.e., magnitudes of force in respective Cartesian directions), and time of contact [t]. Other information may be reported with respect to each point-force detection in other embodiments (or system configurations) including, for example and without limitation, contact area and shape thereof (e.g., enabling distinction between a user's finger and a stylus or other object), trending direction/magnitude of applied force (e.g., diminishing or increasing during frequency-to-digital conversion interval), etc. Each reported bulk force (BF[0], BF[1], . . . ) may similarly be characterized by bulk-force type (shear, twist, tensile, compression, vibration etc.), contact outline or pattern, and time of detection.

Figure 9:
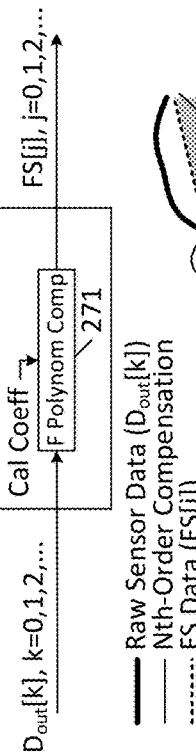
FIG. 9 illustrates a frequency-modulating sensor system in which raw sensor data is subject to polynomial compensation within an array controller to yield normalized force-sense data that increases linearly with applied force.

In a number of embodiments, raw sensor readout data (i.e., sequence of frequency words) is digitally processed to reject noise (increase signal-to-noise ratio) and compensate systemic error. In one implementation, depicted for example in FIG. 9, raw sensor data (e.g., frequency words from sensor cells) is subject to polynomial compensation within array controller 270 (or alternatively within an event definition engine or other host system component) to yield normalized force-sense data that increases in a predetermined mathematical relation to applied force—linearly in the FIG. 9 example. More specifically, production-time sensor calibration operations are executed to characterize the raw sensor data output from each individual sensor cell in the sensor array. Those characterizations are used in turn to produce sensor-specific Nth-order polynomial compensation coefficients ("Cal Coeff") that are applied to raw run-time sensor data by run-time force-polynomial compensator 271 to yield a linearized output (or exponential output, logarithmic output, piecewise linear output, etc.). In one embodiment, for example, force-polynomial compensator 271 is implemented by a digital processing engine and coefficient lookup table. As frequency words arrive in sequence for respective sensor cells, the compensator sequences through the lookup table to obtain corresponding sets of polynomial coefficients (i.e., coefficients for sensor i, coefficients for sensor i+1, etc.) to be applied against the raw data values. In the particular embodiment shown, the raw sensor data ($D_{OUT}$ [k]) is linearized by the polynomial compensator (yielding corresponding force-sense data values FS[j]), though various other fit-to-curve operations may be carried out in alternative embodiments, including logarithmic (or exponential) fit, piecewise linear or polynomial fit, etc. Raw sensor data may additionally be interpolated, merged or otherwise processed to generate force-sense data with increased or reduced spatial resolution (e.g., trading spatial resolution for force magnitude resolution or vice-versa)—that is, the number of force-sense data values per force-image frame may be greater or less than the count of sensor cell readouts per force-image frame (i.e., force-sense index 'j' does not necessarily correspond one-for-one with raw data index 'k').

Figure 10:
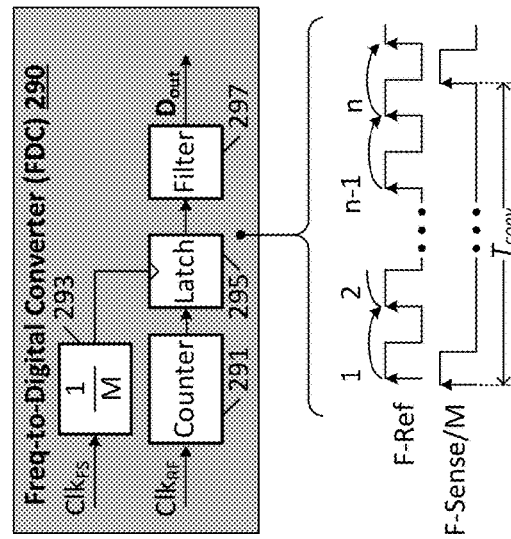
FIG. 10 illustrates an embodiment of a frequency-to-digital converter (FDC) circuit that may be used to implement the intra-cell FDC shown in FIG. 1.

FIG. 10 illustrates an embodiment of a frequency-to-digital converter (FDC) circuit 290 that may be used to implement the intra-cell frequency-to-digital converter ("Freq-to-Digital") shown in FIG. 1 and others discussed above. As in the FIG. 1 frequency-to-digital converter, FDC 290 receives a frequency reference, $Clk_{RF}$ (e.g., a clock from a MEMS-based oscillator disposed within the host device in a way that avoids sensitivity to applied force (e.g., suspended within a fluid layer, mounted such that touch-surface deflection imparts no or negligible strain on internal resonator structures, engineered to avoid sensitivity to applied force or other sensed phenomena (e.g., temperature insensitive)), that may be compared with the force-sense signal, $Clk_{FS}$, to enable generation of a digital value that varies with force-sense frequency change. More specifically, FDC 290 generates a count of reference clock cycles within counter 291 over a predetermined number (M) of force-sense cycles (a conversion interval $T_{conv}$ marked by transition of a frequency-divided force sense signal generated within divide-by-M circuit 293), latching a digital value (i.e., in latch 295) indicative of the frequency ratio between the two clock signals. An optional filter 297 (e.g., IIR, FIR or any other practicable digital filter) may be provided to low-pass-filter a sequence of latched frequency values to yield a finalized $D_{OUT}$ result. Because the reference clock frequency change is relatively impervious to change in property of interest (e.g., exhibits negligible frequency change as applied force transitions between minimum and maximum detectable values in the force-sensing embodiments described above), the $D_{OUT}$ value is representative of the $Clk_{FS}$ frequency change and thus constitutes a digital frequency word. In general, the conversion time and resolution within FDC 290 are inversely proportional as quantization error (e.g., average time interval between successive transitions of $Clk_{FS}/M$ and $Clk_{RF}$) attenuates as the latched sample count grows (i.e., attenuates with the number of conversion intervals due to statistical averaging). Also, various techniques may be employed to minimize quantization error, including raising the transition rate of the reference clock (e.g., by generating a relatively high frequency reference clock, generating reference clock sub-phases with fine-grained edge-to-edge timing offsets within a delay line, etc.). More generally, while an exemplary frequency-to-digital conversion approach is demonstrated in FIG. 9, any circuit capable of generating a range of digital values as a function of $Clk_{FS}$ frequency may be used to generate frequency words in alternative embodiments.

Returning briefly to FIGS. 1 and 2, it will be appreciated that implementation of individual sensor cells 103 and, more specifically, orientation of the resonant structures(s) therein relative to the force-touch surface may impact sensitivity. For example, where a resonant member anchor points fall along a given "sensitivity" axis, tensile or compressive force applied along that axis (e.g., in response to substrate deflection as shown in FIG. 2) may be sensed with higher signal-to-noise ratio (and thus greater resolution) than tensile or compressive force applied along an axis orthogonal to the sensitivity axis. This sensor directionality is leveraged in a number of embodiments to implement "anisotropic" sensor arrays that are directionally sensitive (i.e., detecting/emphasizing applications of force along a given axis) and/or to guide sensor placement within directionally insensitive "isotropic" sensor arrays. FIG. 11, for example, illustrates disposition of directionally-sensitive sensor cells in alternating orientations (indicated by arrows extending from individual sensor cells) to achieve multi-axis sensitivity and thus an isotropic sensor array 301. FIG. 12 illustrates an alternative sensor cell array 305 in which co-located sensors, sensors with multi-axis resonance modes and/or multiple internal resonators disposed in different orientations yield multi-axis sensitivity and thus isotropic character at each sensor-cell site, and FIGS. 13A-13C illustrate sensor array embodiments in which sensor cells are differently (non-uniformly) oriented at particular regions or with regard to particular points of interest within a sensor array to provide anisotropic force-sensing (i.e., non-uniform sensing directionality at different regions of the array). In FIG. 13A, for example, sensor cells are aligned along different axes of sensitivity (orthogonal axes in this instance) in respective regions 321 and 323 of a sensor array, while sensor cells are radially aligned with a region of interest (a "target" region in which 'X' marks the center of the target) in FIG. 13B (other "dead" areas of the touch surface may have no sensors or a lower sensor-cell density). In FIG. 13C, sensor cells 335 adjacent a secured boundary—which prevents, for example, significant touch-surface deflection in a particular direction—are aligned with direction(s) along which the touch-surface is free to deflect, while other sensor cells 337 disposed further from the secured boundary are implemented with multi-axis sensitivity. While the one or more in-plane axes of sensitivity (i.e., axes of sensitivity parallel to the plane of the touch surface) are depicted in FIGS. 11-13C, sensor cells additionally or alternatively having sensitivity along axes normal to the touch surface or otherwise out-of-plane (e.g., at any non-zero angle of incidence with the surface).

While FIGS. 11-13C generally relate to sensing a particular property (e.g., applied force), sensor cells capable of sensing more than one property of interest may be employed throughout or in particular regions of a resonant sensor array. FIG. 14, for example, illustrates an exemplary sensor array 350 populated in whole or part by sensor cells that exhibit frequency change in response to applied force and temperature. In one embodiment, for example, two different resonant modes of the same MEMS resonator exhibit respective dependences on frequency and temperature (e.g., resonance mode 1 showing a force-touch-responsive frequency change, "M1 Freq", and resonance mode 2 exhibiting a temperature-responsive frequency change, "M2 Freq"). In other embodiments, separate MEMS components (multiple resonators, resonator and MEMS thermistor, etc.) may be provided in each sensor cell or otherwise co-located to provide spatially-distributed multi-sensing capability. In the case of multi-resonator sensor cells, one resonator may be engineered to be particularly sensitive to a characteristic of interest (force, temperature, etc.), while the other is engineered to be insensitive (independent) with respect to that same characteristic, thus enabling change (or absolute value) in the property/characteristic of interest to be determined and/or tracked over time based on a frequency difference between the sensitive and insensitive resonators (the "sensing" and "control" resonators). A similar approach may be implemented in which the sensing and control resonators are implemented in separate sensor cells, or where a single control resonator is used as a control for sensing resonators disposed in multiple sensor cells.

As briefly discussed above in reference to FIG. 9, polynomial (or exponential, logarithmic, etc.) compensation coefficients may be generated/updated during production-time and/or run-time calibration operations and applied to establish compensated sense data output with respect to a resonant sensor array. In regard to force-sensing, at least, such calibration operations may be implemented with respect to both wafer-level and system-level implementation of resonant sensor arrays (i.e., with respect to a wafer that contains multiple sensor arrays and/or components thereof, or with respect to individual/singulated resonant sensor arrays). FIG. 15 illustrates a number of wafer-level and system-level calibration techniques in which a wafer or singulated sensor array is subject to uniform stress for purposes of canceling systemic offsets and scaling differences between respective sensor cell outputs. In one embodiment, the resonant sensor array (i.e., frequency-modulating sensor array) is probed or otherwise queried to observe and record stress-free sensor cell output frequencies (401). Thereafter, the resonant sensor array is subjected to stress that manifests substantially uniformly with respect to constituent sensor cells. In one calibration approach, for instance, the resonant sensor array is mounted to or otherwise disposed over curved or contoured vacuum chuck so that, when a vacuum is pulled, the sensor array bows to meet the curved chuck surface as shown at 403, thereby inducing tensile stress within individual sensors (a similar approach may be achieved by pulling a vacuum through an opening in a concave fixture to flex the sensor array into a concave bow). In other embodiments, the resonant sensor array may be subject to temperature-induced stretching as shown at 409, or bonded to a material layer having a different temperature-coefficient-of-expansion so that, as temperature is increased, the sensor array bows as shown at 411 to induce tensile stress, etc. In any case, while stressed, sensor cell output frequencies are observed and recorded as shown at 405—an operation which may optionally be repeated at different levels of applied stress (e.g., at different temperatures, vacuum-pull strengths, etc.) to obtain as many data points as needed to enable determination of compensation coefficients or other compensation-profile information at 407.

FIGS. 16A and 16B illustrate additional or alternative system-level calibrations in which one or more point forces are applied (e.g., through one or more mechanical probes or wands) at respective sensor-array surface points to enable generation of compensation (offset-canceling and scale-equalizing) coefficients. In FIG. 16B, for example, a point force is applied at each of a sequence of fiducial locations with respect to sensor cells (e.g., between and/or on-top of sensor cell locations) and optionally repeated over a range of applied forces. In the embodiment of FIG. 16B, a ball, cylinder or other object is rolled/moved along a prescribed path (e.g., a diagonal zig-zag in the particular example shown) to apply a sequence of forces to the sensor array—applied forces which may be sampled as the moving contact progresses (including optionally stopping the rolling contact at a sequence of points) to enable generation of compensation coefficients. More generally, a broad variety of different calibration operations (including combinations of calibration operations) may be carried out, including periodic run-time calibration operations, to enable generation of and/or update to calibration coefficients applied to compensate sensor cell outputs.

In general, all MEMS sensor cells may be trimmed to exhibit the same nominal frequency at rest (e.g., baseline atmospheric pressure, but no applied force otherwise) so that the zero-crossing is the same for all sensor cells. Additionally, all sensor cells may be calibrated to exhibit the same scale (i.e., magnitude of frequency change in response to change in applied pressure) so that the same applied force at different regions of the sensor array will yield substantially the same output values from the sensor cells at those different regions. In a number of embodiments, including those discussed above, zero-trim and/or scaling calibration may be accomplished through digital signal processing (i.e., frequency-word compensation), but in other embodiments one or more mechanical/material calibrations (e.g., modification of resonator stiffness through wafer- or system-level adjustment to resonator composition, structure, mass, etc.) may be carried out to adjust the baseline (zero) frequency and/or frequency scale of each MEMS resonator.

With regard to periodic calibration executed during system run-time, nearest neighbors could be used to find anomalous sensors as well as trim out drift over small regions (an example of a system level calibration). The sensor or system could remove low frequency signals, or use those filtered values to re-zero the sensor (a servo loop) from influences such as bulk forces (device bending, twisting, vibration, etc.), aging, environmental factors (such as moisture affecting the adhesive attach), etc. In yet other embodiments, the sensor-array-wide reference frequency (i.e., used for frequency to digital conversion in some embodiments) may itself be adjusted to effect a global calibration of frequency offset. In yet other embodiments, sensitivity of individual sensor cells could be dynamically adjusted (e.g., electronically and/or mechanically) to sense disparate types of inputs (e.g., a sensor array could be transitioned between a force-touch screen function and a microphone-array function). Run-time calibration operations may be triggered by various criteria, including time-elapse/regular-interval, error-event detection (e.g., detection of anomalous outputs from one or more sensors), trauma events (e.g., updating or regenerating baseline calibration after detection of potentially disruptive event such as an impulse force (dropped device), twist/bend or other bulk force, disruptive vibrational environment, etc.), host/user input requesting calibration or recalibration, and so forth. Calibration triggering events and/or time intervals may be programmed within the sensor system (e.g., within a non-volatile memory or run-time programmed register within the read-out controller and/or event definition engine) by other elements of the host system or via an interface that directly accesses the sensor system hardware.

Figure 17:
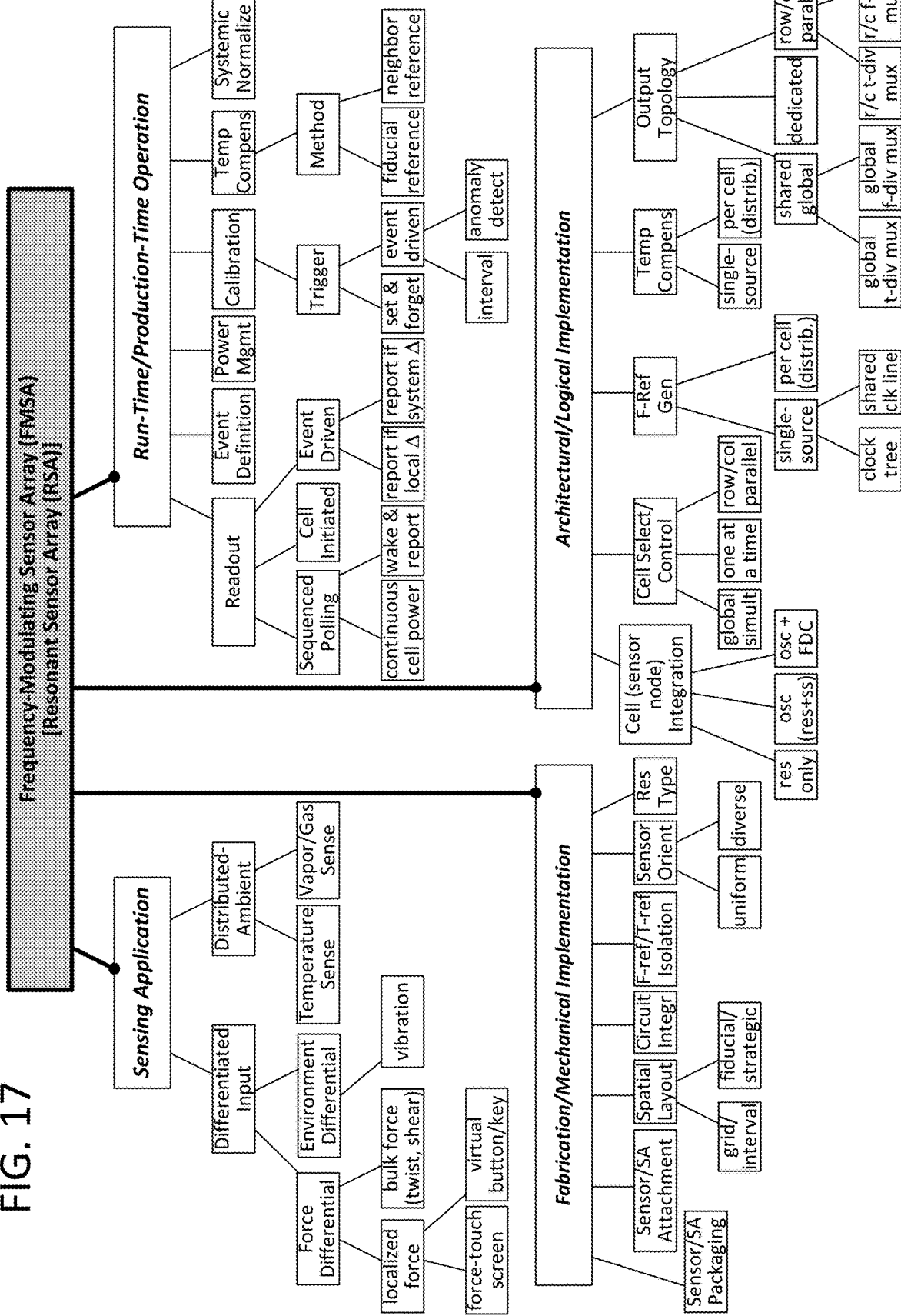
FIG. 17 illustrates a hierarchical organization of exemplary and non-exhaustively-listed variations of frequency-modulating sensor systems described herein.
Figure 18:
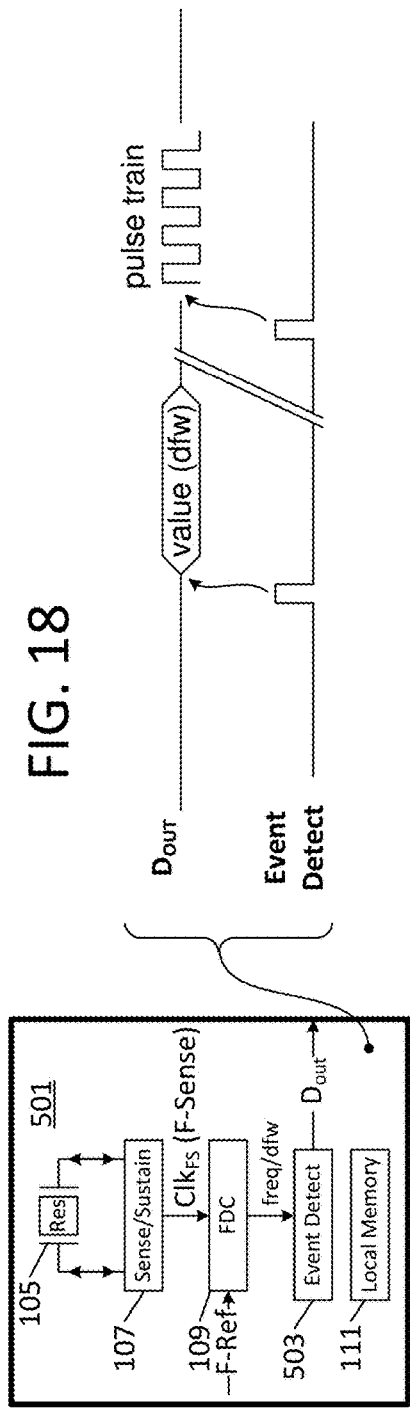
FIG. 18 illustrates a pipelined sense/read example in which individual sensor cells within a resonant sensor array are implemented with circuitry that enables sensor-cell power-up and/or data output in response to detecting threshold change in the input state or sensor cell state.

Reflecting on frequency-modulating sensor arrangements discussed this far, numerous variants may be implemented along a number of subject matter categories including, for example and without limitation, various different sensing applications, manner of sensor fabrication and/or mechanical/physical implementation, architectural implementation (e.g., level of sensor cell integration, manner of cell selection/control, etc.) and run-time or production-time operation. FIG. 17 is graphical illustration of such various embodiments which include, for example and without limitation:

1) Various sensing applications
   a) differentiated input sensing
      i) differential force (differences in applied force across regions of a surface or within regions of a volume)
         (1) localized force
            (a) force-touch screen (as shown in FIG. 1, for example)
            (b) virtual button/key (e.g., "button" implemented at particular surface region of handheld device by virtue of force-sensing at that region)
         (2) bulk force (e.g., twist, shear, tensile, compression, vibration, etc.)
      ii) differential environmental condition (differences in temperature, pressure, atmospheric composition, etc. across regions of a sensing surface or within regions of a sensing volume)
   b) distributed ambient sensing
      i) temperature sensing, including detection of temperature variation across a surface or within a volume
      ii) environmental composition, including detecting presence of vapor or gas and/or variation in vapor/gas concentration across a surface or within a volume
2) fabrication/mechanical implementation
   a) sensor and sensor-array packaging
   b) sensor and sensor-array attachment to surface or within volume/housing of host device
   c) spatial layout of sensor cells (e.g., within one-, two- or three-dimensional space)
      i) evenly spaced intervals such as a grid/array in two or three dimensions
      ii) strategically located (e.g., at opposite edges of a surface to enable detection of localized point forces within that surface)
      iii) oriented in one or more dimensions such that MEMS resonant structure extends in a direction and/or is sensitive to force directed parallel to a touch surface or normal (or otherwise off-angle) to the touch surface as shown and described, for example, below
   d) manner of frequency reference and/or temperature reference isolation
   e) sensor orientation/directional sensitivity
      i) uniformly oriented sensor cells to yield isotropic or anisotropic sensing
      ii) diversely (disparately) oriented sensor cells
         (1) multi-directional/omni-directional sensor cells (including sensor cells having two or more axes of sensitivity as in FIG. 12)
         (2) regionally disparate sensor-cell axes of sensitivity to provide directional sensing along different axes at respective regions of a surface or volume (e.g., FIGS. 13A-13C);
      iii) multi-dimensional (e.g., sensor cells capable of sensing two or more properties of interest, such as force and temperature as in FIG. 14);
   f) resonator type and sensitivity
      i) single directional resonance mode to implement a unidirectional sensor cell
      ii) multi-directional resonance mode (e.g., breath mode) to implement a multi-directional sensor cell
      iii) multiple resonance modes that are frequency modulated by respective sensed properties (e.g., first resonance mode subject to frequency change according to variation in applied force, second resonance mode subject to frequency change according to temperature variation)
3) architectural/logical implementation
   a) sensor cell integration level
      i) resonator only—non-integrated primitive sensor cell
         (1) energy to trigger resonant oscillation optionally provided from external source via dedicated or shared input line (e.g., as in FIGS. 19 and 20 discussed below)
      ii) resonator and sense/sustain circuit (i.e., oscillator)—partially integrated sensor cell
      iii) resonator, sense/sustain circuit and frequency-to-digital converter—fully integrated sensor cell
      iv) resonator, sense/sustain circuit, frequency-change detection circuitry integrated within sensor cell with optional frequency-to-digital converter (e.g., as shown in FIG. 18 discussed below)
   b) cell selection/control
      i) global simultaneous (e.g., frequency-division multiplexed sensor outputs)
      ii) individual cell time-multiplexed (one sensor cell selected at a time in round-robin fashion)
      iii) cell group time-multiplexed (e.g., one row at a time, one column at time, one cluster at time)
   c) frequency-reference generation
      i) single-source frequency reference (e.g., conveyed on a shared clock line or generated in numerous instances through clock tree)
      ii) reference clock per individual sensor cell
      iii) reference clock per sensor-cell group (e.g., cell row, column, cluster, etc.)
   d) temperature compensation
      i) single source temperature reference (e.g., same temperature information applied to temperature-compensate frequency data output from each sensor cell)
      ii) temperature compensation source per individual sensor cell
      iii) temperature compensation source per sensor-cell group (e.g., row, column, cluster, etc.)
   e) output topology
      i) shared output line coupled to each sensor cell in resonant sensor array (e.g., distributed multiplexing onto shared read-out line and/or frequency-multiplexed output onto shared read-out line)
      ii) dedicated output line per sensor cell (e.g., with optional centralized multiplexing at the edge of the sensor array or input to array controller component)
      iii) grouped output lines, one per group (cluster, row, column, etc.) of sensor cells and routed between cell group and respective read-out circuit or routed to multiplexer at edge-of sensor-array and/or input to array controller—each group-shared output line being time-division multiplexed or frequency-division-multiplexed
4) run-time/production-time operation
   a) readout operation
      i) array-controller-initiated through sequenced, round-robin polling
         (1) sensor cells under continuous power (at least during active-power mode)
         (2) wake each cell or cell group, one after another, as part of sensor-cell or sensor-cell-group readout ii) sensor-cell initiated readout (driven by event detection within sensor cell)
  (1) sensor cell initiates readout in response to detecting change in sensed-property state (e.g., force-touch event)
  (2) sensor cell initiates readout in response to detecting change in ambient environment (e.g., report force-sense data in response to temperature rise/fall by threshold amount)
iii) array-controller-initiated in response to system-level event detect
  (1) readout sensor array or subset thereof in response to host-level command and/or status change (e.g., power-state change, application executed that requires operation of resonant sensor array, etc.)
  (2) readout sensor array or subset thereof in response to event detected within array-controller (e.g., temperature change, calibration interval expires (time for further calibration), etc.)
b) event definition
  i) process raw sensor-array output data to generate/report listing and sequence of force-touch events (e.g., point-location in 2D or 3D space, time, magnitude/direction of applied force)
  ii) process raw sensor-array output data to generate/report listing and sequence of bulk force events (squeeze, twist, sheer, stretch, etc., including time of detection and magnitude/direction of bulk force)
  iii) process raw sensor-array output to generate user-input definitions and/or usage warnings (single button/key press, multiple buttons/keys pressed simultaneously, finger or hand pattern, swipe or other gesture, squeeze or twist wakeup, shear and/or twist force approaching damage threshold, potentially inadvertent user-input, etc., all with point location and/or level-of-force in user touch)
c) power management
  i) transition to low-power mode in which FDC circuitry and/or MEMS resonator actuation within selected sensor cells (e.g., every other cell in a spatial layout) is disabled—trading reduced spatial resolution for power conservation
  ii) transition to low-power mode in which FDC circuitry within all sensor cells is disabled but can be relatively quickly be reactivated—trading input response time for power conservation
  iii) transition to low-power mode in which FDC circuitry (if any) and sense/sustain circuitry in all sensor cells is disabled—sleep mode having longer reactivation time than if sense/sustain left enabled, but further reduced power consumption
d) sensor array calibration
  i) calibration methodology
    (1) calibration reference
      (a) global fiducial reference
        (i) sensor cell output (e.g., in response to one or more applied force levels) compared with pre-recorded reference data to generate calibration/compensation coefficients
        (ii) sensor cell output compared with dynamically generated reference data to generate calibration/compensation coefficients
      (b) neighbor-cell or other local/in-situ reference
        (i) sensor cell output (e.g., in response to one or more applied force levels) compared with data generated by one or more neighboring sensor cells (or all sensor cells) to generate calibration/compensation coefficients
        (ii) sensor cell output compared with data generated by fiducial reference disposed within sensor array (e.g., isolated force sensor or temperature sensor)
    (2) calibration input source
      (a) wafer-level or system-scale stretching/bending
        (i) vacuum pull over curved surface (e.g., air chuck as in FIG. 15)
        (ii) bi-morph wafer bow (e.g., as in FIG. 15 alternative)
        (iii) temperature-induced stretching (e.g., as in FIG. 15 alternative)
      (b) active force application
        (i) wand or probe touch-force application to selected surface regions with corresponding force-sense readout (e.g., as in FIG. 16A)
        (ii) roller force or other continuous contact-force progression over surface regions/paths (e.g., as in FIG. 16B) with corresponding force-sense readout
  ii) calibration trigger
    (1) one-time set and forget (e.g., at initial power-up, during production-time calibration, etc.)
    (2) event-driven
      (a) at even time intervals (periodic calibration)
      (b) in response to anomalous events (e.g., out-of-range sensor-cell data output, discrepancy or other error detection, etc.)
e) temperature compensation
  i) temperature data obtained from individual sensor cells or sensor-cell regions used to compensate resonator frequency measurement
  ii) one or more independent temperature references within sensor array used to compensate sensor-cell resonator frequency measurements
  iii) one or more independent temperature references external to sensor array used to compensate sensor-cell resonator frequency measurements
f) systemic normalization
  i) normalizing individual sensor-cell outputs by canceling bulk-force application (e.g., normalizing sensor cell output data according to twist or shear force detection that would otherwise render non-uniform sensor cell frequency data despite uniform surface point-force application)
  ii) normalizing individual sensor-cell outputs according to temperature differential across (or in different regions of) sensor array FIG. 18 illustrates a pipelined sense/read example in which individual sensor cells 501 within a resonant sensor array are implemented with event detection circuitry 503 (together with a MEMS resonator 105 and other circuitry 107, 109, 111 as discussed above) that enables sensor-cell power-up and/or data output in response to threshold change in input state (or sensor cell state), either in time, or in the value of the sensor, so as to wake up a system or carry out any other "event-detect" triggered operation. In one embodiment, for instance, the event detection circuit within the sensor cells 501 or any subset of sensor cells 501 monitor user contact or other applied force with respect to a smartphone or other handheld device while the device is initially in low power mode, spontaneously (volitionally) outputting a frequency data word, pulse train or other signal in response to detecting a contact event. By this arrangement, the sensor cell(s) 501 may wake the handheld device from the low power mode (i.e., triggering a transition to a more active, higher-power mode) in response to detecting applied force on a touch-surface or other region of the device in a predetermined or user-programmed way (i.e. no need to touch the home button, or move it, or otherwise wake up the entire system).

Figure 19:
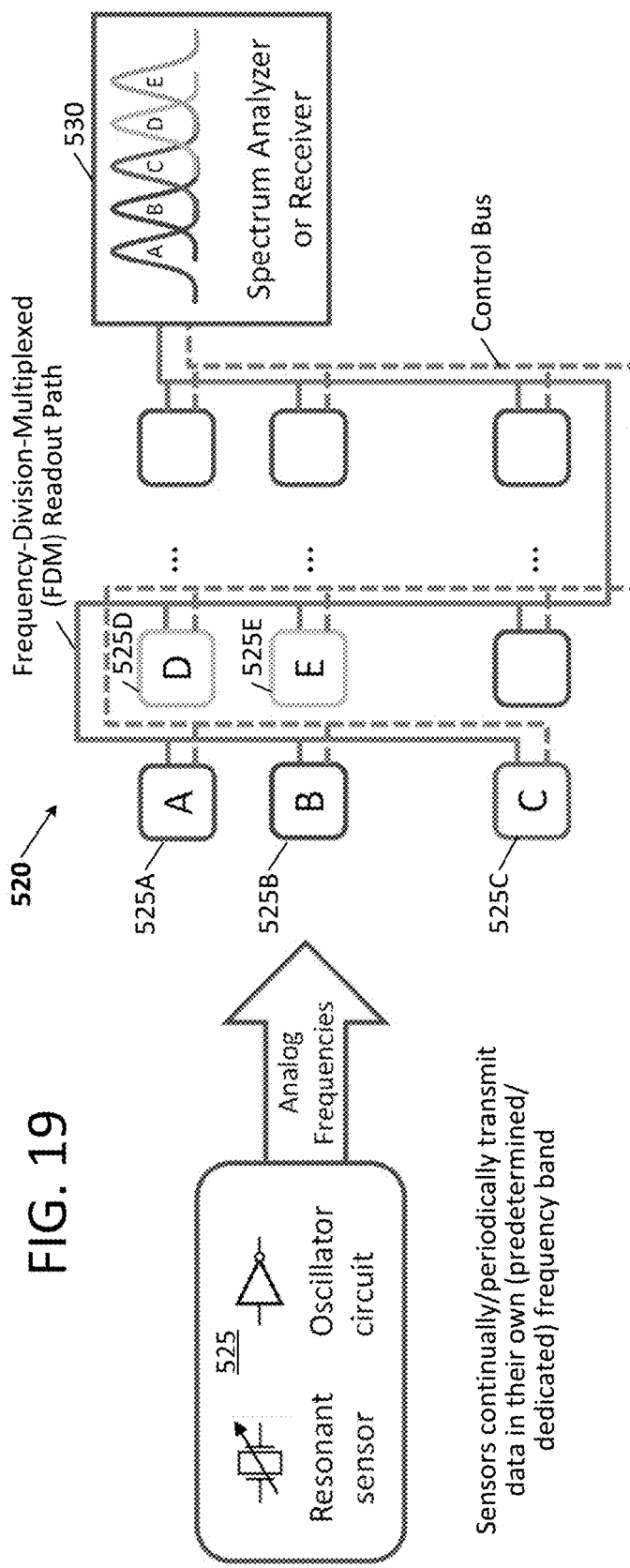
FIG. 19 illustrates an alternative sensor readout architecture in which a shared readout line (or bus) is frequency multiplexed with outputs from respective sensor cells, each implemented by a MEMS resonator and sense/sustain circuit.

FIG. 19 illustrates an alternative sensor readout architecture 520 in which a shared readout line (or bus) is frequency multiplexed with outputs from respective sensor cells (525A, 525B, 525C, 525D, 525E, etc.; shown in individually representative instance at 525), each implemented by a MEMS resonator ("Resonant sensor") and sense/sustain circuit ("Oscillator circuit")—that is, each sensor cell 525 is an oscillator. In one embodiment, the MEMS resonator within each sensor cell 525 is implemented or tuned (i.e., at production-time and/or run-time) to have a nominal baseline output frequency that is spectrally offset from the nominal baseline output frequencies of the other sensor cells, thus enabling frequency-division multiplexing of sensor-cell outputs on the shared readout path. Readout circuitry within an array controller 530 may select individual frequency spectrums allocated to respective sensors sequentially or in parallel (e.g., effecting a spectral analysis) to recover and digitize frequency outputs from those sensors.

Figure 20:
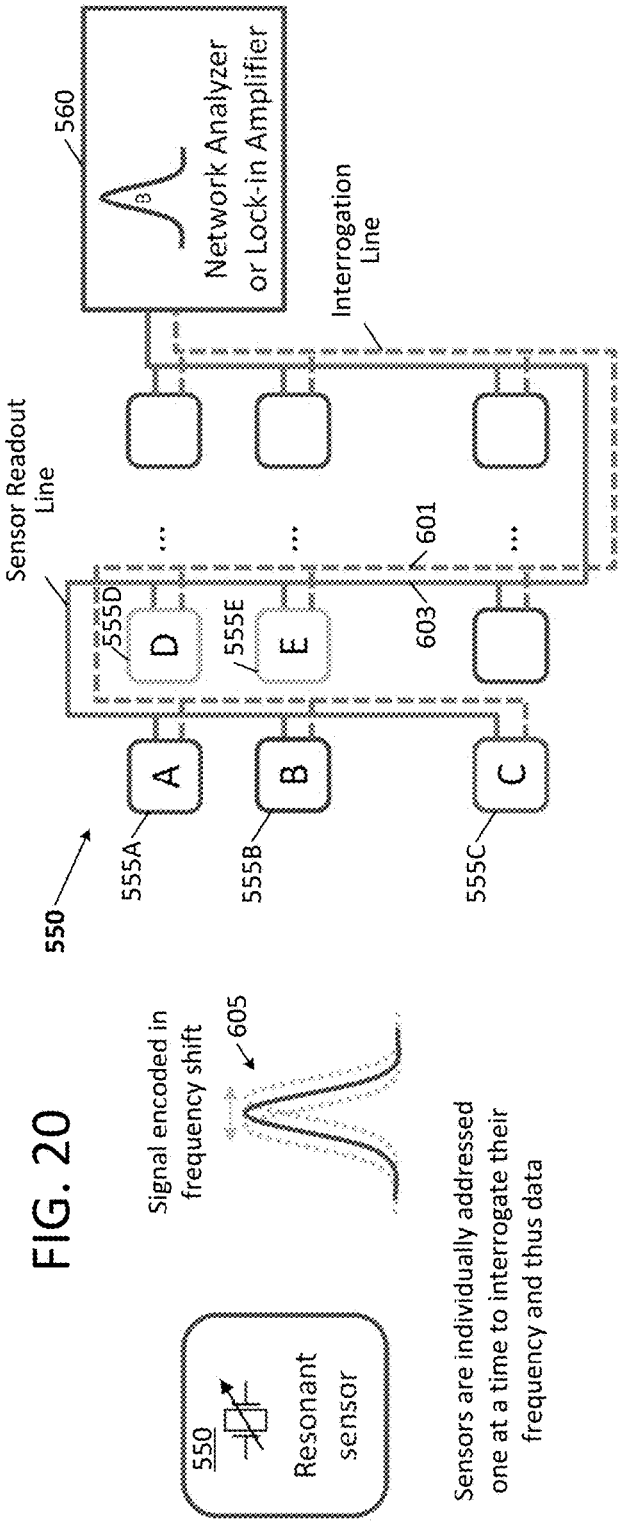
FIG. 20 illustrates an alternative discrete-frequency sensor array embodiment in which individual MEMS resonator sensor cells lack local sense/sustain circuits and are instead actuated by waveforms which may be frequency specific, noise, or spectrally shaped combinations thereof.

FIG. 20 illustrates an alternative discrete-frequency sensor array embodiment 550 in which individual MEMS resonator sensor cells (555A, 555B, 555C, 555D, 555E, etc.; shown in individually representative instance at 555) lack local sense/sustain circuits and are instead actuated by respective interrogative frequency-specific waveforms. In the particular example shown, for instance, an array controller 560 (which may include a network analyzer or lock-in amplifier) outputs respective waveforms, for instance sinusoidal, via shared interrogation line 601, with each waveform having a frequency that is tuned to interrogate (i.e., sustain temporary resonant oscillation) within a respective one of the resonant sensor cells 555. Thus, each sensor cell 555 may be interrogated by controller transmission of a respective waveform having a frequency that corresponds to the nominal (baseline) frequency of a given cell—the subject sensor cell 555 responding to the interrogative waveform by generating an output pulse train (MEMS resonator oscillation frequency which is sensitive to applied force or other measurement characteristic) on a shared readout line 603. A network analyzer or lock-in amplifier within the array controller evaluates the output pulse train from each sensor cell to determine the frequency shift relative to cell-specific baseline as shown at 605 (i.e., generate a frequency word for each sensor cell).

Figure 21:
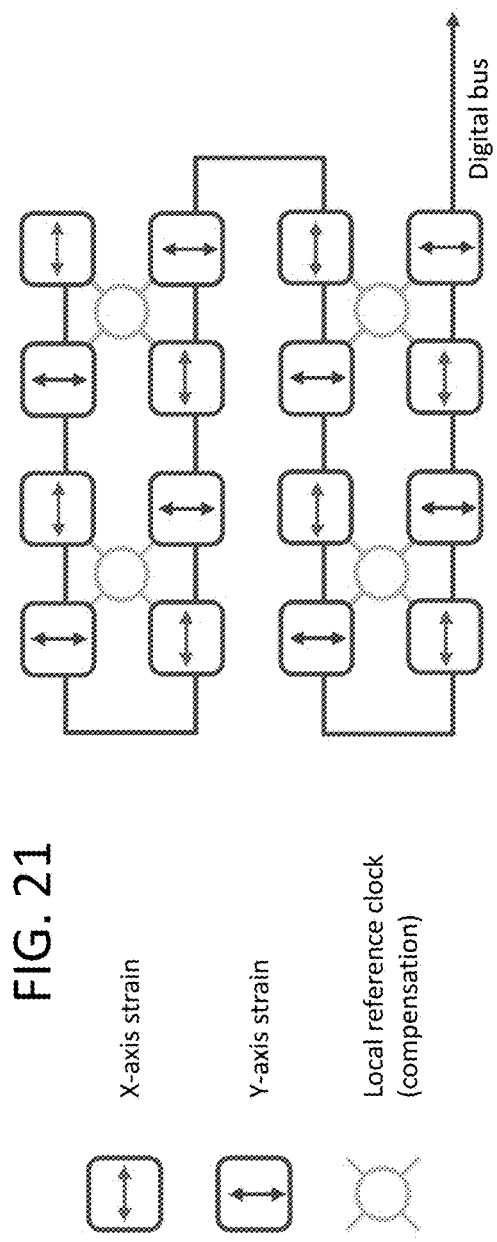
FIG. 21 illustrates a variation of the resonant-sensor array shown in FIG. 1 in which the globally-distributed reference clock is replaced by multiple local reference clocks to enable compensation for regional environmental differences, aging effects, and so forth.

FIG. 21 illustrates a variation of the resonant-sensor array shown in FIG. 1 in which the globally-distributed (and generally invariant) reference clock is replaced by multiple local reference clocks (e.g., each disposed in a respective region of the sensor array) to enable compensation for regional environmental differences, aging effects, etc. In yet other embodiments, a globally distributed reference clock may be locally compensated (e.g., clock frequency passively or actively modified) to account for regional environmental/aging effects. In both cases the local clocks/local compensation circuitry may respond to compensation inputs from the array controller or other components of the host system.

Figure 22:
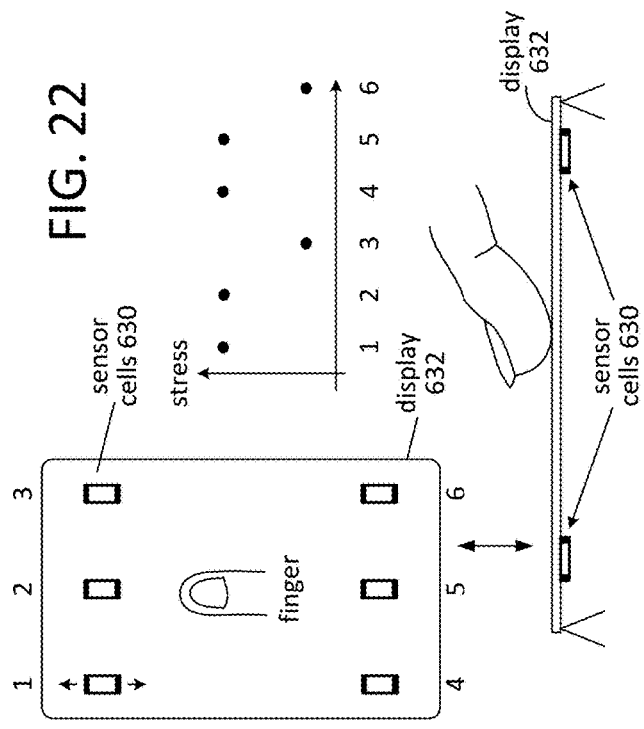
FIG. 22 illustrates a resonant sensor configuration in which sensor cells are disposed in strategic positions that enable determination of the location/magnitude/direction of force inputs adjacent or otherwise proximal to the specific sensor-cell positions.

FIG. 22 illustrates a resonant sensor configuration in which sensor cells 630 are disposed in strategic positions with respect to a display 632 (i.e., other than two-dimensional or three-dimensional grid) that enable determination of the location/magnitude/direction of force inputs adjacent or otherwise proximal to the specific sensor-cell positions. As with other sensor-cell configurations, force-inputs detected/reported by individual sensor cells may be interpolated/extrapolated to achieve spatial sensing resolution higher than the sensor-cell density (i.e., sub-sensor sampling).

Figure 23A:
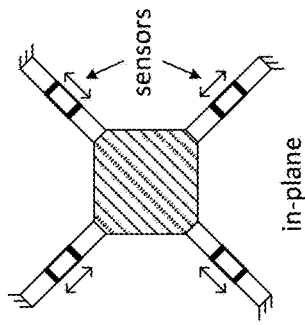
FIGS. 23A and 23B illustrate embodiments of an interposer structure that maps one or more spatial force inputs into contributions on a small plurality of sensors whose signal magnitudes may be measured and then combined mathematically to "triangulate" the input.
Figure 23B:
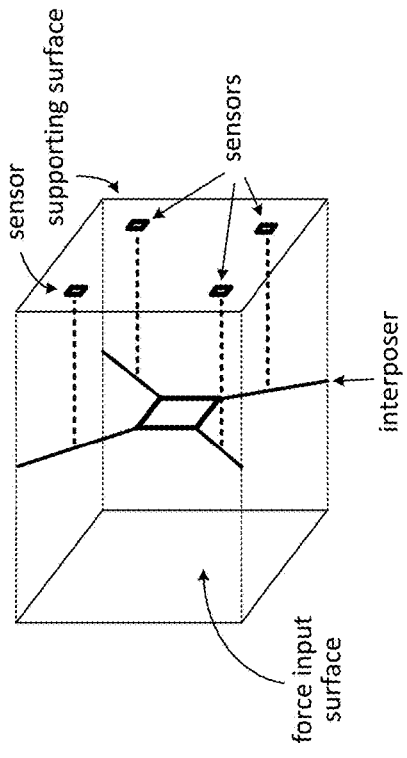

FIGS. 23A and 23B illustrate embodiments of an interposer structure that maps one or more spatial force inputs into contributions on a small plurality of sensors (in this case four) whose signal magnitudes may be measured and then combined mathematically to "triangulate" the input.

Figure 24:
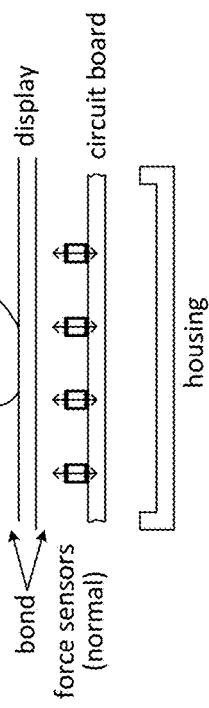
FIG. 24 illustrates an embodiment of a non-planar sensing array where the force is measured in the Z-axis (in 3-D) with sensors sensitive to force/pressure rather than strain.

FIG. 24 illustrates an embodiment of a non-planar sensing array where the force is measured in the Z-axis (in 3-D) with sensors sensitive to force/pressure rather than strain.

Figure 25A:
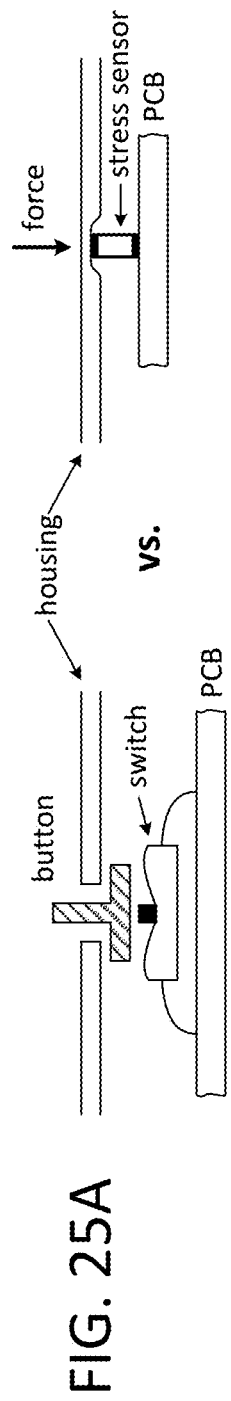
FIGS. 25A and 25B illustrate single-sensor-cell approaches in which in-plane or out-of-plane sensors replace mechanical switches leading to reduced size, increased robustness and/or increased lifetime.
Figure 25B:
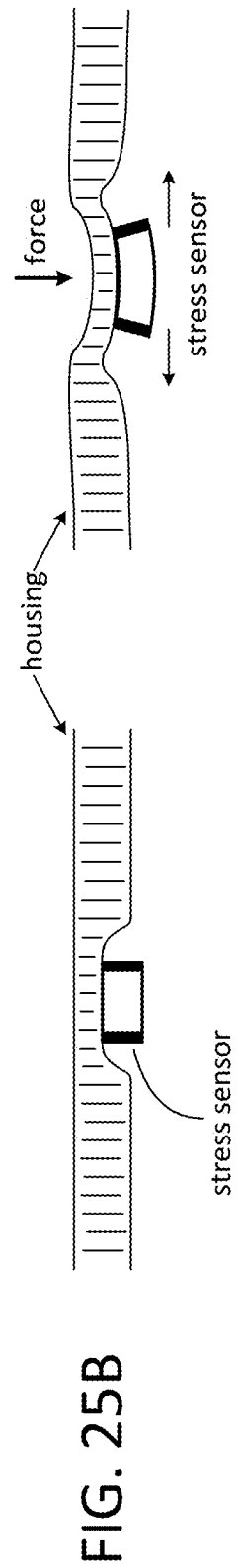

The various sensor-array concepts discussed above may also be applied in the context of single sensor or switch inputs. For example, FIGS. 25A and 25B illustrate single-sensor-cell approaches in which in-plane or out-of-plane sensors replace mechanical switches leading to reduced size, increased lifetime, robustness (no holes, no moving parts).

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific communication protocols, interconnect topologies, sensor implementations, component elements and the like can be different from those described above in alternative embodiments. Signal paths depicted or described as individual signal lines may instead be implemented by multi-conductor signal buses and vice-versa, and may include multiple conductors per conveyed signal (e.g., differential or pseudo-differential signaling). The term "coupled" is used herein to express a direct connection as well as a connection through one or more intervening functional components or structures. Device configuration or programming can include, for example and without limitation, loading a control value into a register or other storage circuit within an integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. A device comprising:
a surface;
one or more microelectromechanical systems (MEMS) resonators mounted in proximity to the surface, so as to be stressed and thereby change in resonance frequency as the surface is engaged by a force, the one or more MEMS resonators sufficient to produce at least two electronic signals each representing a different orientation of a resonance mode axis relative to a direction of the force relative to the surface; and
circuitry to receive the at least two electronic signals, and to generate therefrom a signal representing the direction of the force relative to the surface.

2. The device of claim 1 wherein:
the one or more MEMS resonators comprises a first resonator and a second resonator;
the surface has a first axis;
the first resonator and the second resonator are respectively oriented so as to provide different, respective, resonance mode orientations relative to the first axis; and
the at least two electronic signals comprises a first signal, representing a sensed resonance frequency of the first resonator, and a second signal, representing a sensed resonance frequency of the second resonator.

3. The device of claim 1 wherein:
the one or more MEMS resonators comprises a first resonator, the first resonator being a multi-axis-resonance-mode resonator; and
the at least two electronic signals comprises a first signal, representing a sensed resonance frequency of a first resonance-mode axis of the first resonator, and a second signal, representing a sensed resonance frequency of a second resonance-mode axis of the first resonator.

4. The device of claim 3 wherein:
the multi-axis-resonance-mode resonator has an in-plane resonance mode and an out-of-plane resonance mode; and
the signal representing the direction of the force is dependent of change in resonance frequency, if any, with respect to each of the in-plane resonance mode and the out-of-plane resonance mode.

5. The device of claim 1 wherein:
the circuitry comprises readout circuitry to sample each MEMS resonator of the one or more MEMS resonators during time intervals, so as to obtain for each MEMS resonator samples taken at respective times; and
the circuitry to generate the signal representing the direction of the force is to determine the direction of the force relative to the surface in a manner that is dependent on the samples taken at respective times.

6. The device of claim 1 wherein the surface comprises glass and wherein each MEMS resonator of the one or more MEMS resonators is mounted on a substrate, between the substrate and the glass, in a manner so as to be structurally-stressed as the surface is engaged by the force.

7. The device of claim 1 wherein the device further comprises calibration circuitry to, for each MEMS resonator of the one or more MEMS resonators, identify drift frequency drift over time, store compensation information to correct the identified drift, and apply the compensation information so as to dynamically normalize a resonator output.

8. The device of claim 1 wherein the device further comprises circuitry to store calibration information for the one or more MEMS resonators, in the form of at least one polynomial, and apply the calibration information so as to normalize a resonator output.

9. The device of claim 1 wherein:
the one or more MEMS resonators comprises two or more resonators; and
the two or more resonators are characterized by a post-formation wafer-level mass difference, produced as an observable result of a wafer-level mass adjustment frequency trim operation, such that at least one of the two or more resonators is structurally different from at least one other of the two or more resonators.

10. The device of claim 1 wherein:
the circuitry is to store, for each of the at least two electronic signals, a corresponding baseline frequency;
for each of the at least two electronic signals, the circuitry is to identify a frequency deviation relative to the corresponding baseline frequency; and
the circuitry is to calculate the direction dependent on each frequency deviation.

11. The device of claim 1 wherein:
the device further comprises a timing signal generator, to produce a reference timing signal;
for each of the at least two electronic signals, the circuitry is to identify a frequency deviation using the reference timing signal; and
the circuitry is to calculate the direction dependent on each frequency deviation.

12. A device comprising:
a surface;
one or more microelectromechanical systems (MEMS) resonators mounted in proximity to the surface, so as to be stressed and thereby change in resonance frequency as the surface is engaged by a force, the one or more MEMS resonators sufficient to produce at least two electronic signals each representing a different orientation of a resonance mode axis relative to a direction of the force relative to the surface; and
circuitry to sample each MEMS resonator of the one or more MEMS resonators during time intervals, so as to obtain for each MEMS resonator samples taken at respective times, and to generate therefrom a signal representing the direction of the force relative to the surface.

13. The device of claim 12 wherein:
the one or more MEMS resonators comprises a first resonator and a second resonator;
the surface has a first axis;
the first resonator and the second resonator are respectively oriented so as to provide different, respective, resonance mode orientations relative to the first axis; and
the at least two electronic signals comprises a first signal, representing a sensed resonance frequency of the first resonator, and a second signal, representing a sensed resonance frequency of the second resonator.

14. The device of claim 12 wherein:
the one or more MEMS resonators comprises a first resonator, the first resonator being a multi-axis-resonance-mode resonator; and
the at least two electronic signals comprises a first signal, representing a sensed resonance frequency of a first resonance-mode axis of the first resonator, and a second signal, representing a sensed resonance frequency of a second resonance-mode axis of the first resonator.

15. The device of claim 14 wherein:
the multi-axis-resonance-mode resonator has an in-plane resonance mode and an out-of-plane resonance mode; and
the signal representing the direction of the force is dependent of change in resonance frequency, if any, with respect to each of the in-plane resonance mode and the out-of-plane resonance mode.

16. The device of claim 14 wherein the surface comprises glass and wherein each MEMS resonator of the one or more MEMS resonators is mounted on a substrate, between the substrate and the glass, in a manner so as to be structurally-stressed as the surface is engaged by the force.

17. The device of claim 12 wherein the device further comprises calibration circuitry to, for each MEMS resonator of the one or more MEMS resonators, identify drift frequency drift over time, store compensation information to correct the identified drift, and apply the compensation information so as to dynamically normalize a resonator output.

18. The device of claim 12 wherein the device further comprises circuitry to store calibration information for the one or more MEMS resonators, in the form of at least one polynomial, and apply the calibration information so as to normalize a resonator output.

19. The device of claim 12 wherein:
the one or more MEMS resonators comprises two or more resonators; and
the two or more resonators are characterized by a post-formation wafer-level mass difference, produced as an observable result of a wafer-level mass adjustment frequency trim operation, such that at least one of the two or more resonators is structurally different from at least one other of the two or more resonators.

20. The device of claim 12 wherein:
the circuitry is to store, for each of the at least two electronic signals, a corresponding baseline frequency;
for each of the at least two electronic signals, the circuitry is to identify a frequency deviation relative to the corresponding baseline frequency; and
the circuitry is to calculate the direction dependent on each frequency deviation.

21. The device of claim 12 wherein:
the device further comprises a timing signal generator, to produce a reference timing signal;
for each of the at least two electronic signals, the circuitry is to identify a frequency deviation using to the reference timing signal; and
the circuitry is to calculate the direction dependent on each frequency deviation.

22. A device comprising:
a surface;
one or more microelectromechanical systems (MEMS) resonators mounted in proximity to the surface, so as to be stressed and thereby change in resonance frequency as the surface is engaged by a force, the one or more MEMS resonators sufficient to produce at least two electronic signals each representing a different orientation of a resonance mode axis relative to a direction of the force relative to the surface; and
circuitry to
for each of the at least two electronic signals, provide at least one reference, and detect a frequency deviation, if any, using the at least one reference, and
generate, from each detected frequency deviation, a signal representing the direction of the force.

* * * * *